May 12, 1970     E. R. BARTLE, JR., ET AL     3,511,768
LABORATORY OZONE GENERATOR
Filed Aug. 8, 1967
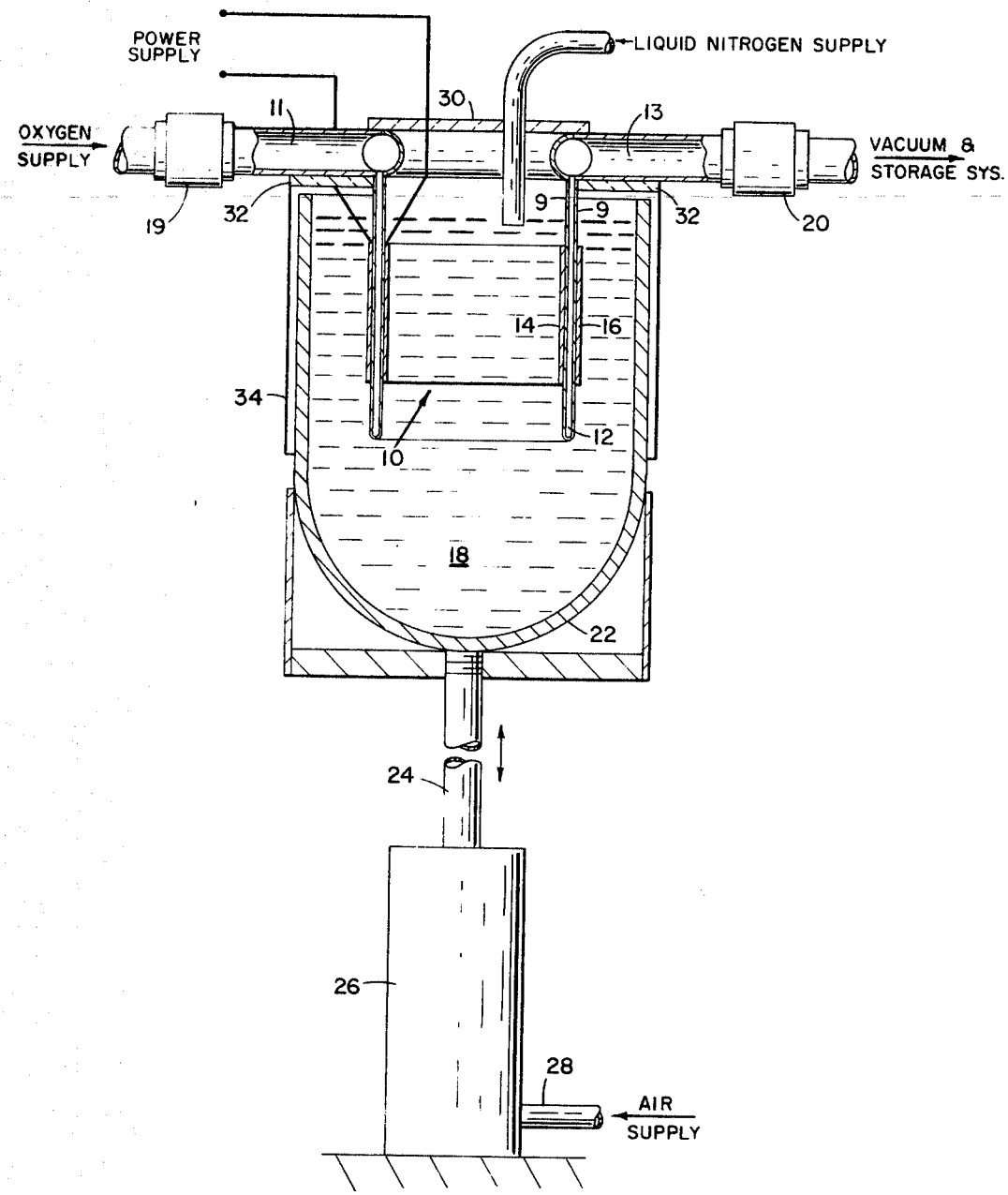
Ervin R. Bartle, Jr.
Paul R. Erickson
Edgar A. Meckstroth
Benjamin F. Myers, Jr.,
          INVENTORS.
BY Harry M. Saragovitz
    Edward J. Kelly
    Herbert Berl ATTORNEYS
    Elihu L. Turetsky AGENT 3,511,768
Patented May 12, 1970

3,511,768
LABORATORY OZONE GENERATOR

Ervin R. Bartle, Jr., San Diego, Paul R. Erickson, El Cajon, Edgar A. Meckstroth, La Mesa, and Benjamin F. Myers, Jr., San Diego, Calif., assignors, by mesne assignments, to the United States of America as represented by the Secretary of the Army
Filed Aug. 8, 1967, Ser. No. 659,569
Int. Cl. C01b 13/12
U.S. Cl. 204—321                              6 Claims

ABSTRACT OF THE DISCLOSURE

An apparatus for preparing ozone in an electric discharge. Two coaxial cylindrical walls are spaced to define a cylindrical reaction chamber. A source of alternating current is connected to electrodes secured onto the outside surfaces of the outer and inner walls to provide an electric discharge in the chamber. A high purity oxygen is passed through the chamber at reduced pressure via inlet and outlet means provided at the same end of the chamber while the other end is immersed in a cryogenic liquid.

BACKGROUND OF THE INVENTION

This invention relatees to an ozone generator for synthesizing ozone and in particular to a laboratory ozone generator for producing pure ozone.

Ozone can be produced photochemically by the action of ultraviolet light of wavelengths shorter than 2200 A. on oxygen or air. The photo-chemical method of ozone formation is used commercially in applications where small quantities and very low concentrations of ozone are desired. In practically all other laboratory or industrial applications, ozone is produced by the action of the ozonator discharge on air or oxygen.

If a pair of electrodes are separated by at least one layer of dielectric (such as glass) in addition to the air space, and a high-voltage alternating current is applied, the air space is filled with a diffused glow, which is called the "ozonator discharge." To obtain a true ozonator discharge there must be an insulating layer for without it only a spark or arc would occur, and this is a less efficient form of discharge.

An apparatus designed to produce ozone by means of the ozonator discharge is called an ozonator or ozonizer.

The basic features of the ozonizer were developed by Siemens (1857). The gases pass between two concentric glass tubes— the inner tube being coated on the inside and the outer tube being coating on the outside—with metal foil serving as electrodes.

In an improved arrangement, the inner tube is made of metal and serves as one electrode, and the outer tube, made of glass, dips into cooling water that serves as the second electrode.

Ozonizers have been made in various other forms, but in general two or more discharging surfaces are placed in juxtaposition so as to form a condenser with an air gap which is preferably furnished with a dielectric element. Most successful ozonizers have smooth electrodes and dielectrics and assume either the cylindrical or the plate form.

The cylindrical (tubular) ozonizers are more compact and operate at lower voltages than the plate forms. Small-capacity ozonizers, such as those used in the laboratory, are usually constructed with a single pair of electrodes and are almost always tubular in shape. Generally speaking, laboratory ozonizers are designed to yield higher concentrations of ozone and to operate on oxygen as well as air. To obtain these high concentrations of ozone (high-purity ozone), distillation of the liquid ozone is generally required.

In all of these ozonizers, improper handling of ozone, particularly in the liquid state, may lead to violet explosions. Because of this hazard, a safer process for producing high-purity ozone is needed.

Accordingly, it is the principal object of this invention to produce relatively pure ozone for laboratory use in an economical and efficient manner.

Another object of this invention is to produce ozone with safety.

A particular object of this invention is to produce high-purity ozone without the necessity of distillation.

SUMMARY OF THE INVENTION

High-purity ozone may be synthesized with safety by the use of a process comprising the steps of containing liquid nitrogen inside a vacuum Dewar, supporting a dielectric ozonizer in the liquid nitrogen, evacuating the ozonizer to a low vacuum through a vacuum outlet, closing the vacuum outlet of the ozonizer introducing high-purity oxygen into the ozonizer through an inlet, closing the inlet, positioning metal electrodes on the inner and outer surfaces of the ozonizer, applying a high discharge alternating voltage across the metal electrodes and oxygen therebetween, and removing the ozone thereby formed. The product is high-purity ozone. The apparatus used comprises an annular ozonizer of Pyrex glass with electrodes secured onto the outer and inner surfaces. The ozonizer is immersed inside liquid nitrogen contained in a vacuum Dewar. Inlet and exit tubing are connected to the annular space of the ozonier.

Brief description of the drawing

These and other objects and attendant advantages of this invention will become more readily apparent by reference to the following detailed description of the preferred embodiment of the invention, of which the accompanying drawing forms an integral part.

In the drawing, the single figure is a diagrammatic representation of the preferred embodiment of the ozone generator of this invention.

Description of the preferred embodiment

Referring now to the single figure, the preferred embodiment of the ozone generator of this invention includes an ozonizer designated generally as 10 which comprises two concentric annular walls 9 separated by a discharge gap 12. Each wall 9 is formed from Pyrex glass, enabling it to withstand the drastic temperature changes involved (e.g., room temperature to 77° K. 77° K. is the boiling point of liquid nitrogen at atmospheric pressure). The discharge gap is 2.0 mm. Ozonizer 10 has a Pyrex wall 9 thickness of approximately 2.5 mm. The diameter of the ozonizer measured to the center of the discharge gap is 8.9 cm., and the length measured to the center of the 1.9 cm. diameter inlet 11 and exit 13 tubing is 16.5 mm. Electrodes 14 and 16 are formed from thin copper alloy sheets that are spring loaded and snapped onto the inner and outer diameters, respectively, of the ozonizer 10. By spring loading the electrodes, the different thermal contractions of the glass (Pyrex) ozonizer 10 and the electrodes 14 and 16 are accommodated upon immersion into liquid nitrogen 18.

The oxygen supply flows through valve 19 via inlet tubing 11, while the vacuum and storage systems are connected to outlet valve 20 via exit tubing 13.

A vacuum Dewar 22 contains the source of liquid nitrogen 18. Vacuum Dewar 22 may be raised to the position shown or lowered by means of a pneumatically operated piston (not shown) and shaft 24 inside cylinder 26 which is connected to an air supply via conduit 28. Cover 30 is made of Plexiglas, as is cover 32. Mylar curtain 34 is connected to cover 32.

The operation of the laboratory ozone generator of the figure is as follows. Before ozone synthesis is started, the ozonizer is evacuated to remove residual contaminants that might promote rapid decomposition of ozone to oxygen. Normally, a thorough cleaning of all the surfaces (using trichloroethylene, methyl alcohol and distilled water, in that sequence) that contact the ozone, followed by an evacuation of the ozonizer to a pressure of $10^{-4}$ mm. Hg is adequate to insure negligible ozone decomposition. Following the evacuation of the ozonizer, valve 20 is closed and oxygen of high-purity (99.999% $O_2$) is admitted to the ozonizer. With the Dewar in the up position (shown) and filled with liquid nitrogen, the oxygen condenses to maintain a pressure of 162 mm. Hg (the vapor pressure of $O_2$ at 77° K.). When the amount of oxygen desired to be converted to ozone has been condensed in the ozonizer, valve 19 is closed and the high voltage turned on. Using a conventional gaseous tube "neon light" type transformer (France Mfg. Co., 15060P) and an input variac (both of which are not shown), discharge voltages from 15 to 19 kv. have been successfully used. The ozone production rate is strongly dependent upon this voltage, varying from 1.1 gm. $O_3$/hr. at 19 kv. to 0.6 gm. $O_3$/hr. at 15 kv. With a higher voltage transformer, production could be greatly increased. The limit would be reached when the electrodes get hot enough to promote ozone decomposition. Since the electrodes are immersed in liquid nitrogen, very high voltages can be used (and correspondingly high ozone production rates obtained). It should be noted that the ozone production rates given above are for the particular ozonizer geometry and size. Larger volumes would increase the ozone production rates (for a given voltage).

The ozone production rate is essentially constant for a fixed discharge voltage and ozonizer geometry as long as some of the oxygen remains condensed. When all of the liquid oxygen is gone (through conversion to gaseous oxygen and hence to ozone), the oxygen pressure starts dropping, since the ozone generated is frozen out by the liquid nitrogen bath. If desired, the discharge may be continued and essentially all of the remaining oxygen may be converted to ozone. The actual ozone production rate is directly proportional to the oxygen pressure remaining and so the production rate continually decreases after the liquid oxygen supply is exhausted. Thus, in practical operation, once the amount of ozone desired is obtained, the discharge is stopped and the excess oxygen pumped off, bringing the pressure in the ozonizer to 0.0035 mm. Hg.

The discharge gap 12 should be 2-3 mm. and preferably 2.0 mm.

Once the pure ozone is frozen out and all of the excess oxygen (if any) removed, the liquid nitrogen Dewar is lowered using the pneumatically operated piston and shaft 24.

The ozone slowly warms and is converted to the gaseous phase, expanding through valve 20 into the storage system. This is the most hazardous part of the operation and if the vaporization appears to be occurring too rapidly, a safety button (not shown) may be depressed which activates the pneumatic cylinder 26, and as a result the liquid nitrogen Dewar is rapidly raised to the upper position (shown). Furthermore, if desired, the entire ozone generation system may be inclosed on five sides by a ¼" Plexiglas shield (not shown) and by a fine mesh shield or screen (not shown) behind the ozonizer to prevent injury to the operator in the possible event of an explosion.

The Mylar curtain 34 attached to the Plexiglas cover 32 serves three purposes. As the liquid nitrogen in the Dewar boils away, the curtain contains the gaseous nitrogen in the ozonizer area and displaces any oxygen initially present. This prevents any ozone from being formed on the outside of the system, as would happen if the liquid nitrogen level dropped below the electrodes and the oxygen in the atmosphere allowed in the vicinity. It also prevents excess water from being condensed in the Dewar and on the outside of the ozonizer. Last, it serves as a heat shield and allows the ozonizer to warm slowly during the solid to gaseous ozone conversion phase. If the solid ozone is heated too rapidly, there may be the possibility of explosions.

Up to three grams of ozone (determined to be such by analysis) have been produced in one experiment, and in the over 100 times the ozonizing system has been used, no explosions have occurred.

The method of this invention for producing pure ozone is much more efficient and economical than any flow type ozonizer presently being commercially produced. The pure ozone produced by the method of this invention is especially desirable for use in laboratories for the study of various chemical reactions. Using high-purity oxygen (99.999% $O_2$) as an input to the ozone generator, ozone with less than 10 parts per million oxygen contamination has been easily synthesized. A source of relatively pure ozone is thus made available for laboratory experiments. Known existing ozone generators utilize a flowing oxygen system which converts only a fraction of the oxygen to ozone and which requires extensive distillation procedures to obtain pure ozone.

Various other modifications and variations of this invention will become readily apparent to those skilled in the art in the light of the above teachings, which modifications and variations are within the spirit and scope of this invention.

We claim:
1. An ozone generator having an ozonizer comprising two coaxial cylindrical walls separated by a small gap, said walls being made from a dielectric material and connected at one end to form a chamber therebetween, a first metal electrode on the inside of the inner one of said two coaxial cylindrical walls, a second metal electrode on the outside of the outer one of said two coaxial cylindrical walls, inlet means at the other end communicating with said chamber, a vacuum outlet also at the other end communicating with said chamber and a source of high discharge alternating voltage connected across said metal electrodes and means supported relative to said coaxial cylindrical walls to provide cooling to said chamber.

2. An ozone generator as set forth in claim 1 wherein said means for cooling includes a vacuum Dewar separated from said ozonizer and movable relative to said coaxial cylindrical walls.

3. An ozone generator as set forth in claim 2 wherein liquid nitrogen is contained inside said vacuum Dewar and around said coaxial cylindrical walls.

4. An ozone generator set forth in claim 3 wherein said gap is from about 2 to about 3 millimeters.

5. An ozone generator as set forth in claim 4 additionally comprising a curtain secured to said ozonizer and around said vacuum Dewar to define a space between said vacuum Dewar and said curtain, said space being in flow communication with said liquid nitrogen contained inside said vacuum Dewar.

6. An ozone generator as set forth in claim 5 additionally comprising pneumatic means for moving said vacuum Dewar relative to said ozonizer.

References Cited

UNITED STATES PATENTS

| | | | |
|---|---|---|---|
| 2,822,327 | 2/1958 | Hammesfahr et al. | 204—320 |
| 2,876,188 | 3/1959 | Thorp et al. | 204—176 |
| 3,205,162 | 9/1965 | MacLean | 204—176 |

ROBERT K. MIHALEK, Primary Examiner

U.S. Cl. X.R.

204—176